United States Patent
Larminy et al.

(10) Patent No.: US 12,240,521 B2
(45) Date of Patent: Mar. 4, 2025

(54) METHOD FOR FINE-TUNING A VARIABLE-GEAR STEERING COLUMN, AND VEHICLE COMPRISING A VARIABLE-GEAR POWER STEERING SYSTEM

(71) Applicant: JTEKT EUROPE, Irigny (FR)

(72) Inventors: Pierre Larminy, Billy Sous les Cotes (FR); André Michelis, Chonas l'Amballan (FR)

(73) Assignee: JTEKT EUROPE, Irigny (FR)

( * ) Notice: Subject to any disclaimer, the term of this patent is extended or adjusted under 35 U.S.C. 154(b) by 313 days.

(21) Appl. No.: 17/525,588

(22) Filed: Nov. 12, 2021

(65) Prior Publication Data

US 2022/0144340 A1    May 12, 2022

(30) Foreign Application Priority Data

Nov. 12, 2020   (FR) ...................... 20/11601

(51) Int. Cl.
 *B62D 15/02*    (2006.01)
(52) U.S. Cl.
 CPC ................... *B62D 15/024* (2013.01)

(58) Field of Classification Search
 CPC ................................................. B62D 15/024
 See application file for complete search history.

(56) References Cited

U.S. PATENT DOCUMENTS

| 2003/0079932 | A1  | 5/2003 | Ono et al. | |
|---|---|---|---|---|
| 2003/0114970 | A1* | 6/2003 | Hara | B62D 5/008 180/443 |
| 2010/0025144 | A1* | 2/2010 | Huang | B62D 6/002 180/401 |
| 2018/0215411 | A1  | 8/2018 | Riot et al. | |

* cited by examiner

*Primary Examiner* — Andrew J Cromer
(74) *Attorney, Agent, or Firm* — Oliff PLC

(57) ABSTRACT

A method for fine-tuning a variable-gear steering column according to a speed of the vehicle, the method includes: a step of characterizing a desired handling of the vehicle for a speed V1 and of characterizing a desired stability for a speed V2; a step of determining a value G1 of the gear ratio allowing obtaining the desired handling at the speed V1, and a value G2 of the gear ratio allowing obtaining the desired stability at the speed V2, a step of calculating a parameter p1 and a parameter p2 according to the speed V1, the speed V2, the value G1 and the value G2 so that the relationship between the gear ratio and the speed of the vehicle is defined by the equation G=p2+p1/V, when the speed is included between a first threshold and a second threshold.

8 Claims, 3 Drawing Sheets

METHOD FOR FINE-TUNING A VARIABLE-GEAR STEERING COLUMN, AND VEHICLE COMPRISING A VARIABLE-GEAR POWER STEERING SYSTEM

The present invention concerns the field of power steering systems, and in particular power steering systems comprising a variable-gear steering column and methods for fine-tuning a variable-gear steering column.

It is known to use a variable-gear steering column to dynamically adjust the relationship between an angular position of the steering wheel and a position of the rack that determines the yaw orientation of the steered wheels, according to states of the system (angular position, . . . ) and of the vehicle (vehicle speed, . . . ); conventionally, this adjustment leads to defining a variable gear ratio, which, for example, is in the form of a ratio between a position of the rack in mm and a position of the steering wheel in number of turns, or of a ratio between an angle of the steering wheel and an angle of the wheels; said ratio is then, at low vehicle speed, respectively high in the first case, or low in the second case, and when the vehicle speed increases, it is respectively increasing in the first case, or decreasing in the second case; This allows having a vehicle that is more handy/reactive at low vehicle speed and more stable at high speed.

The drawback of existing adjustment methods is that the variation of the gear ratio is not perceived as «natural» by the driver, and could be at the origin of a discomfort for the driver in comparison with a fixed gear ratio; this discomfort requires time for the driver to adapt, and could lead to a safety problem if the variation is too brutal.

Hence, the invention aims at providing a solution to all or part of these problems.

To this end, the present invention concerns a method for fine-tuning a relationship defining a gear ratio G of a steering column of a power steering system of a vehicle, according to a speed V of the vehicle, the gear ratio G defining respectively a ratio between a position of a rack of the power steering system and an angular position of a steering wheel of the power steering system, or a ratio between an angular position of a steering wheel of the power steering system and a position of a rack of the power steering system, or a ratio between an angular position of a steering wheel of the power steering system and a yaw angular position of the steered wheels of the power steering system, the method comprising:
  a step of characterizing a desired handling of the vehicle for a first speed of the vehicle and of characterizing a desired stability of the vehicle for a second speed of the vehicle;
  a step of determining a first value of the gear ratio allowing obtaining the desired handling at the first speed of the vehicle, and a second value of the gear ratio allowing obtaining the desired stability at the second speed of the vehicle,
  a step of calculating a first parameter $p_1$ and a second parameter $p_2$ according to the first speed, the second speed, the first value and the second value, so that the relationship between the gear ratio G and the speed V of the vehicle is defined by an equation $$G=(p_2+p_1/V)^n, \text{ with } n=1 \text{ or } n=-1, \qquad \text{[Math 1]}$$

when V is comprised between a first threshold and a second threshold.

According to these arrangements, the variation of the gear ratio according to the inverse of the speed is natural for the driver who does not need time to adapt to this variable gear which does not cause any particular discomfort in comparison with a non-variable gear.

According to these arrangements, the time for fine-tuning the relationship defining a gear ratio according to the speed is short since the number of parameters to be identified is limited.

According to one implementation, the invention comprises one or more of the following features, alone or in a technically-feasible combination.

According to one implementation, the gear ratio is equal to a maximum value when the vehicle speed is lower than the first threshold.

According to one implementation, the second parameter $p_2$ is equal to the second value $G_2$.

According to these arrangements, the number of parameters to be identified is even more limited.

The invention also concerns a power steering system of a vehicle, the power steering system comprising a variable-gear steering column configured so that a gear ratio defining respectively a ratio between a position of a rack of the power steering system and an angular position of a steering wheel of the power steering system, or a ratio between an angular position of a steering wheel of the power steering system and a position of a rack of the power steering system, or a ratio between an angular position of a steering wheel of the power steering system and a yaw angular position of the steered wheels of the power steering system, depends on a speed of the vehicle according to the equation:

$$G=(p_2+p_1/V)^n, \text{ with } n=1 \text{ or } n=-1, \qquad \text{[Math 1]}$$

when V is comprised between a first threshold and a second threshold, $p_1$ and $p_2$ being respectively a first parameter and a second parameter.

According to one embodiment, the invention comprises one or more of the following features, alone or in a technically-feasible combination.

According to one embodiment:
  a first value $G_1$ of the gear ratio allows obtaining a desired handling of the vehicle for a first speed $V_1$ of the vehicle and a second value $G_2$ of the gear ratio allows obtaining a desired stability of the vehicle for a second speed $V_2$ of the vehicle;
  the first parameter p1 and the second parameter p2 being the solutions of the equation system $$\begin{cases} \dfrac{p1}{V_1} + p2 = G_1 \\ \dfrac{p1}{V_2} + p2 = G_2 \end{cases} \qquad \text{[Math 2]}$$

According to one embodiment, the gear ratio is equal to a maximum value when the vehicle speed is lower than the first threshold.

According to one embodiment, the second parameter is equal to the second value.

The invention also concerns a vehicle comprising a power steering system according to any of the embodiments described hereinbefore.

For better understanding thereof, an embodiment and/or an implementation of the invention is described with reference to the appended drawings representing, as a non-limiting example, an embodiment or an implementation respectively of a device and/or a method according to the invention. The same reference numerals in the drawings refer to similar elements or elements whose functions are similar.

Figure 3A:
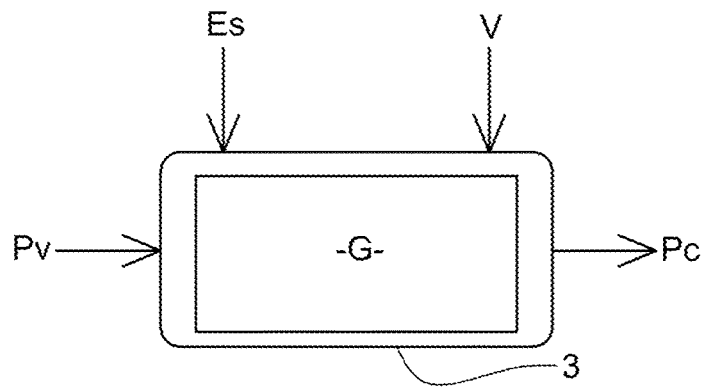
Figure 3B:
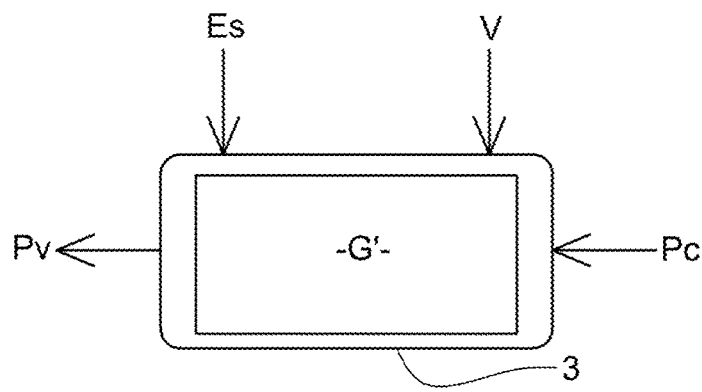

FIG. 3a and [FIG. 3b] are a schematic representation of the variable gear function of a steering column of a power steering system, according to an embodiment illustrated in FIG. 3a or according to an equivalent embodiment in FIG. 3b.

Figure 4:
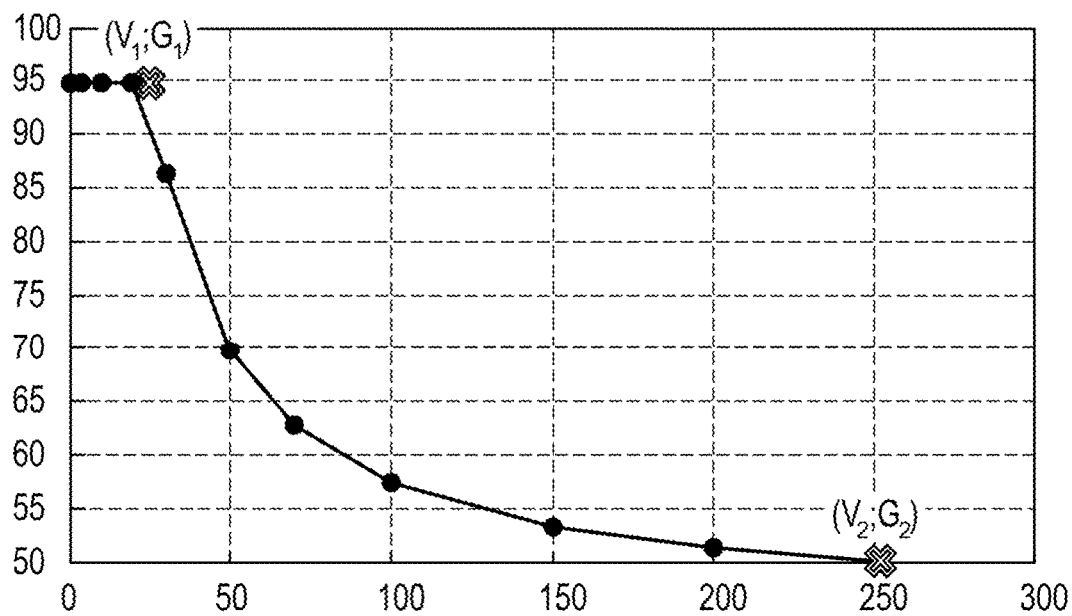

FIG. 4 is a graphical representation of the relationship according to the invention between the gear ratio, represented in ordinates in mm/turn, of a steering column of a power steering system of a vehicle, and the speed V, represented in abscissas in km/h, of said vehicle.

Figure 5:
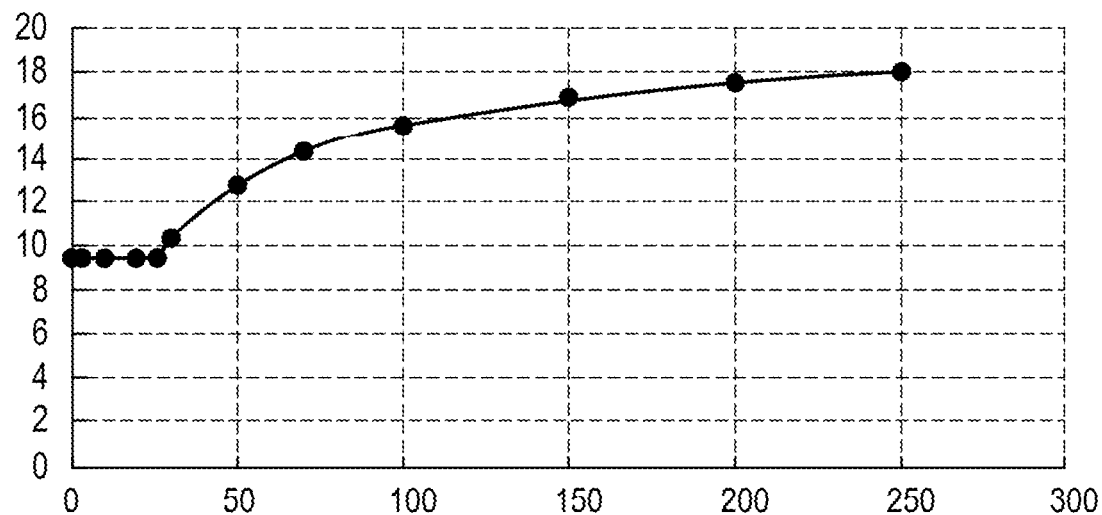

FIG. 5 is a graphical representation of the relationship according to the invention between another gear ratio, the inverse of that represented in FIG. 4, represented in ordinates in turns/mm (or in turns/yaw degree), of a steering column of a power steering system of a vehicle, and the speed V, represented in abscissas in km/h, of said vehicle.

Figure 6:
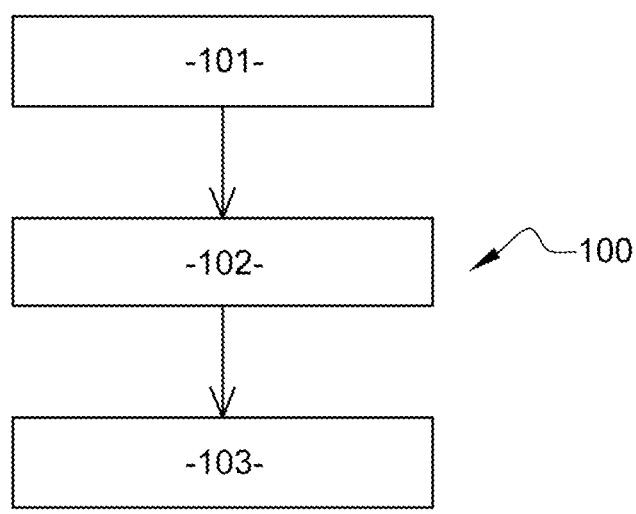

FIG. 6 is a schematic representation of the sequencing of the steps of a method according to an implementation of the invention.

Figure 1:
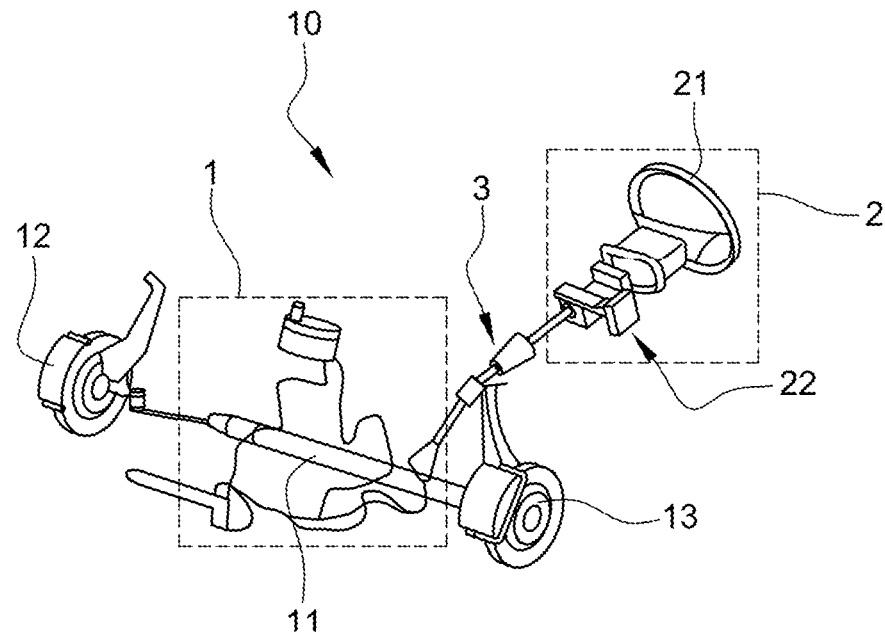
FIG. 1 is a schematic perspective view of a power steering system comprising a variable-gear steering column.
Figure 2:
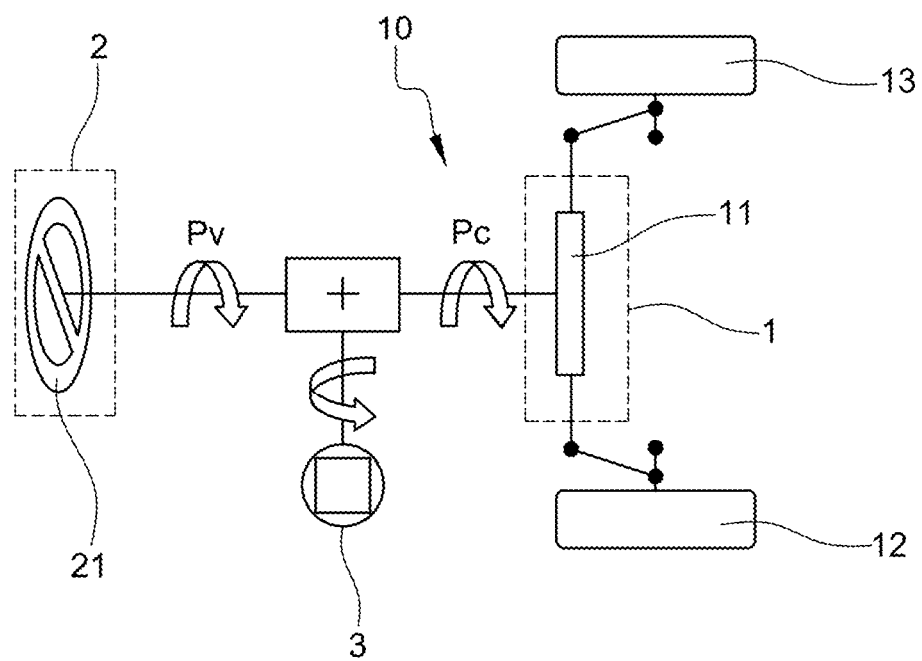
FIG. 2 is a schematic view of a power steering system comprising a variable-gear steering column.

In a known manner, in a power steering system 10, the mechanical link between the steering wheel 21 and the steering rack 11 disappears. A power steering system 10 is composed by two subsystems, illustrated in FIGS. 1 and 2; a steering subsystem 1 (also called low-level system) composed by an actuator allowing displacing the rack 11, in turn connected to the steered wheels 12, 13; and a force feedback subsystem 2 (also called high-level system) composed by an actuator connected to the steering wheel 21 allowing making the driver feel a resistive force. Conventionally, this resistive force is calculated from information of the steering subsystem 1 in order to replicate the same feelings that would be encountered with a conventional steering system.

A coupling architecture allows linking the steering subsystem 1 and the force feedback subsystem 2. Conventionally, the steering subsystem 1 is controlled in position using a controller 22 configured to receive a position setpoint calculated from the position measured at the level of the force feedback system 2 and from a look-up table, or mapping, allowing managing the kinematic relationship between the angular position of the steering wheel Pv and the steering angle of the wheels 12, 13.

A variable-gear steering column is provided with an actuator 3 configured to modify the steering angle of the wheels in conjunction with the action of the driver on the steering wheel 21, according to vehicle data (vehicle speed, stability control, . . . ). Thus, the power steering system 10 equipped with a variable-gear steering column allows adjusting the relationship between the position Pv of the steering wheel 21 and the position Pc of the rack 11. In particular, this relationship may be adjusted dynamically according to the states Es of the steering subsystem 1, an angular position for example, and of the vehicle, the vehicle speed for example.

Typically, a variable gear ratio G of the actuator 3 is predefined so as to be high at low speed and to decrease when the speed increases. This allows having a more handy/reactive vehicle at low speed and more stable at high speed.

FIG. 3 is a schematic representation of the variable gear function of a steering column of a power steering system, according to an implementation illustrated in FIG. 3a or according to an equivalent implementation illustrated in FIG. 3b.

FIG. 3a illustrates the implementation wherein the considered gear ratio is that defined by the ratio between a position of a rack Pc of the power steering system 10 and an angular position of a steering wheel Pv of the power steering system 10. Alternatively, FIG. 3b illustrates the implementation wherein is considered the other gear ratio G', the inverse of the previous ratio, between the position Pv of the steering wheel 21 (in turns for example) and the position Pc (in mm for example) of the rack 11, or in an equivalent manner, between the position Pv of the steering wheel 21 (in turns for example) and the angular position (in yaw degrees) of the steered wheels, of the steering system 10. According to this alternative implementation, the other variable gear ratio G', the inverse of the gear ratio G of the actuator 3, is predefined so as to be low at low speed and to increase when the speed increases. Those skilled in the art should understand that the alternatives illustrated respectively in FIG. 3a, and in FIG. 3b, are equivalent.

The method according to the invention allows fine-tuning a relationship defining a gear ratio G of a steering column of a power steering system 10 of a vehicle, according to a speed V of the vehicle, such that:
  the variation of the gear ratio G is perceived as natural by the driver; the natural aspect is reflected by the fact that the driver does not need time to adapt to this variable gear and that this variation does not cause any particular discomfort in comparison with a non-variable gear ratio,
  the fine-tuning of the relationship defining the gear ratio G according to the speed V of the vehicle, is simple, i.e. based on a limited number of parameters.

Referring to FIG. 6, the method according to the invention comprises the following steps:
  a step 101 of characterizing a desired handling of the vehicle for a first speed $V_1$ of the vehicle, for example: 30 km/h for handling in town for a city car or 100 km/h for a sport car or 130 km/h for a road car, and of characterizing a desired stability of the vehicle for a second speed $V_2$ of the vehicle, for example the maximum speed of the vehicle or any other critical speed in terms of yaw response of the vehicle;
  a step 102 of determining a first vale $G_1$ of the gear ratio allowing obtaining the desired handling at the first speed $V_1$ of the vehicle, and a second value $G_2$ of the gear ratio allowing obtaining the desired stability at the second speed $V_2$ of the vehicle, by adapting this gain G in order to obtain the proper gain at the previously-defined 2 speeds V1 and V2;
  a step 103 of calculating a first parameter $p_1$ and a second parameter $p_2$ according to the first speed $V_1$, the second speed $V_2$, the first value $G_1$ and the second value $G_2$, so that the relationship between the gear ratio G and the speed V of the vehicle is defined by an equation:

$$G = p_2 + p_1/V \quad \text{[Math 1]}$$

when V is comprised between a first threshold and a second threshold.

According to the alternative illustrated in FIG. 3b, considering the other variable gear ratio G', the inverse of the gear ratio G of the actuator 3, the relationship between the other gear ratio G' and the speed V of the vehicle is defined by another equation, equivalent to the previous one:

$$G' = 1/(p2+p1/V) = V/(p2*V+p1) \quad \text{[Math 2]}$$

Thus, through the selection of the parameters $p_1$ and $p_2$, the operator can fully parameterize the function. The variation according the vehicle speed is taken into account by the inverse function (1/V).

The parameters $p_1$ and $p_2$ are calculated by considering 2 characteristic points The $1^{st}$ point at low speed $V_1$ where the gear ratio $G=G_1$ so as to obtain the desired handling.

The $2^{nd}$ point at high speed $V_2$ where the gear ratio $G=G_2$ so as to ensure the stability of the vehicle.

$p_1$ and $p_2$ are found by solving, in a known manner, the equation system:

$$\begin{cases} \dfrac{p1}{V_1} + p2 = G_1 \\ \dfrac{p1}{V_2} + p2 = G_2 \end{cases} \quad \text{[Math 2]}$$

In one embodiment, the gear ratio G may be expressed in mm/turn (rack position Pc in mm, with respect to the steering wheel position Pv in turns). The point $V_1$ is equal, for example to 25 km/h where a gear ratio $G_1$ equal to 95 mm/turn is selected. The point $V_2$ is located, for example at $V_{max}$ at 250 km/h where a gear ratio $G_2$ of 50 mm/turn is selected. The other points are obtained (FIG. 4) through the application of the formula $G=p_2+p_1/V$, wherein $p_1$ and $p_2$ are determined by solving the equation system hereinbefore.

Alternatively to FIG. 4, FIG. 5 graphically represents the relationship between the other gear ratio G', the inverse of that represented in FIG. 4, represented in ordinates in turn/mm (or in turn/yaw degree), of a steering column of a power steering system of a vehicle, and the speed V, represented in abscissas in km/h, of said vehicle.

According to one embodiment, the function 1/v tending to infinity when V tends to 0, G is limited to a maximum value at low speed, as represented in FIG. 4, where there is represented an example of variation of the gear ratio G, represented in ordinates in mm/turn, as a function of the vehicle speed V, represented in abscissas in km/h.

In one embodiment, the gear ratio G may be expressed as a gain with respect to a reference gear. For example, the reference gear may be 50 mm/turn. In this case, the point $V_1$ is equal to 25 km/h where a gear ratio of 1.9 is selected. The point $V_2$ is located at $V_{max}$ at 250 km/h where a gain of 1 is selected. The other ones are obtained through the application of the method hereinabove.

In one embodiment, $p_1/V$ being very low at high speed, it is possible to select $p_2=G_2$. Then, only $p_1$ is still to be determined in order to fully parameterize the relationship defining the gear ratio G according to the speed V of the vehicle.

According to one aspect, the invention also concerns a power steering system of a vehicle, the power steering system comprising a variable-gear steering column configured so that the gear ratio G between an angular position Pv of the steering wheel 21 and an angular position Pc of the rack 11 is defined according to a speed V of the vehicle, by the equation:

$$G = p_2 + p_1/V \quad \text{[Math 2]}$$

when V is comprised between a first threshold and a second threshold, $p_1$ and $p_2$ being respectively a first parameter and a second parameter, solutions of the equation system $$\begin{cases} \dfrac{p1}{V_1} + p2 = G_1 \\ \dfrac{p1}{V_2} + p2 = G_2 \end{cases} \quad \text{[Math 2]}$$

the first value $G_1$ of the gear ratio allowing obtaining a desired handling of the vehicle for the first speed $V_1$ of the vehicle and the second value $G_2$ of the gear ratio allowing obtaining a desired stability of the vehicle for the second speed $V_2$ of the vehicle.

According to one aspect, the invention concerns a vehicle comprising a power steering system 10 according to an embodiment described hereinbefore.

The invention claimed is:

1. A method for configuring a variable-gear steering column of a power steering system of a vehicle, the method comprising:
fine-tuning a relationship defining a gear ratio G of the variable-gear steering column according to a speed V of the vehicle, the gear ratio defining respectively a ratio between a position of a rack of the power steering system and an angular position of a steering wheel of the power steering system, or a ratio between an angular position of a steering wheel of the power steering system and a position of a rack of the power steering system, or a ratio between an angular position of a steering wheel of the power steering system and a yaw angular position of the steered wheels of the power steering system, the fine tuning comprising:
characterizing a desired handling of the vehicle for a first speed $V_1$ of the vehicle and of characterizing a desired stability of the vehicle for a second speed $V_2$ of the vehicle;
determining a first value $G_1$ of the gear ratio allowing obtaining the desired handling at the first speed $V_1$ of the vehicle, and a second value $G_2$ of the gear ratio allowing obtaining the desired stability at the second speed $V_2$ of the vehicle,
calculating a first parameter $p_1$ and a second parameter $p_2$ according to the first speed $V_1$, the second speed $V_2$, the first value $G_1$ and the second value $G_2$, so that the relationship between the gear ratio and the speed of the vehicle is defined by an equation $$G=(p_2+p_1/V)^n, \text{ with } n=1 \text{ or } n=-1$$

when the speed of the vehicle is comprised between a first threshold and a second threshold.

2. The method according to claim 1, wherein the gear ratio is equal to a maximum value when the vehicle speed is lower than the first threshold.

3. The method according to claim 1, wherein the second parameter $p_2$ is equal to the second value $G_2$.

4. A power steering system of a vehicle, the power steering system comprising a variable-gear steering column configured so that a gear ratio G defining respectively a ratio between a position of a rack of the power steering system and an angular position of a steering wheel of the power steering system, or a ratio between an angular position of a steering wheel of the power steering system and a position of a rack of the power steering system, or a ratio between an angular position of a steering wheel of the power steering system and a yaw angular position of the steered wheels of the power steering system, depends on a speed V of the vehicle according to an equation:

$$G=(p_2+p_1/V)^n, \text{ with } n=1 \text{ or } n=-1,$$

when V is comprised between a first threshold and a second threshold, $p_1$ and $p_2$ being respectively a first parameter and a second parameter.

5. The power steering system according to claim 4, wherein:
- a first value $G_1$ of the gear ratio allows obtaining a desired handling of the vehicle for a first speed $V_1$ of the vehicle and a second value $G_2$ of the gear ratio allows obtaining a desired stability of the vehicle for a second speed $V_2$ of the vehicle;
- the first parameter $p_1$ and the second parameter $p_2$ being the solutions of the equation system $$\begin{cases} \dfrac{p1}{V_1} + p2 = G_1 \\ \dfrac{p1}{V_2} + p2 = G_2 \end{cases} \quad [\text{Math 2}]$$

6. The power steering system according to claim 4, wherein the gear ratio is equal to a maximum value when the vehicle speed is lower than the first threshold.

7. The power steering system according to claim 5, wherein the second parameter $p_2$ is equal to the second value $G_2$.

8. A vehicle comprising a power steering system according to claim 4.

\* \* \* \* \*